United States Patent [19]

Saito

[11] Patent Number: 4,773,117

[45] Date of Patent: Sep. 27, 1988

[54] ROTARY WINDOW CLEANER

[75] Inventor: Shosaku Saito, Shizuoka, Japan

[73] Assignee: Saito Motors Co., Ltd., Shizuoka, Japan

[21] Appl. No.: 20,027

[22] Filed: Feb. 27, 1987

[51] Int. Cl.⁴ .............................................. B60S 1/44
[52] U.S. Cl. ............................. 15/250.22; 15/250.16;
296/208; 296/96.15
[58] Field of Search .......... 15/250.22, 250.21, 250.16,
15/250.17; 296/192, 84 R, 208

[56] References Cited

U.S. PATENT DOCUMENTS 2,271,225  1/1942  Heffernan ................... 15/250.22 X
2,895,157  7/1959  Kocourek ..................... 296/192 X
3,649,990  3/1972  Saito ................................ 15/250.22
3,788,681  1/1974  Barenyi et al. ..................... 296/192

FOREIGN PATENT DOCUMENTS

1929085  12/1970  Fed. Rep. of Germany ... 15/250.22
1217286  12/1970  United Kingdom ............. 15/250.16

Primary Examiner—Peter Feldman
Attorney, Agent, or Firm—Bauer & Schaffer

[57] ABSTRACT

A rotary windshield wiper having wipers mounted to rotate and flex so that rotational loci of the wipers on the portions the windowpane are curved downward, whereby the rotary window cleaner is constructed so that it can be installed in front engine type automobiles.

3 Claims, 7 Drawing Sheets

ROTARY WINDOW CLEANER

BACKGROUND OF THE INVENTION

The present invention relates generally to a rotary window cleaner installed in various types of vehicles for removing rain, snow and the like from the outer surface of windowpanes by means of rotation of wipers, and more particularly to such a rotary window cleaner that can be installed in front engine type automobiles in general.

This type of window cleaner is described in the U.S. Pat. No. 3,649,990. This publicly known rotary window cleaner comprises wipers rotating about a shaft. Each wiper is installed on the outer surface of windowpane in such a way that about one half of their rotational range is on the outer surface of a windowpane and the other half is in a hood. A water collecting box covering the other half is installed in the hood, and is provided with drainage pipes for draining water to the exterior from the bottom of the water collecting box.

Accordingly, there are nothing interrupting the field of vision in front of a driver on the outer surface of windowpane, and the outer surface of windowpane is wiped in a semicircular form. Consequently only a very small portion is left to be wiped while the principal portions (ranges stipulated by laws and regulations) are perfectly wiped out. Furthermore, the wiping speed can be freely increased if the number of revolutions of driving motor are increased, because the wipers are of the rotary type. Even at the time of high speed running of vehicle under the conditions of heavy rainfall and snowfall, the window cleaner maintains a perfect transparent state in the required portions of windowpane and produces a sufficient field of vision in front of a driver, enabling him to safely perform the driving of the vehicle. In addition, the rain, snow and the like which have been wiped off the outer surface of windowpane are collected in the water collecting box and are drained through the drainage pipes without scattering to the exterior, so that neither re-wiping of windowpane is required for wiping rain and snow attached off the outer wurface of windowpane nor rain and snow are scattered at the inconvenience to walkers and other automobiles. The above refers to the special features of conventional rotary window cleaner.

However, in the conventional rotary window cleaner mentioned above, the water collecting box is installed such that the back face is flush with the windowpane provided on the front of the driver's compartment of the vehicle, so that the water collecting box enters deep into the engine room to touch the engine in the case of front engine type automobile. Therefore, this causes the problem that it is impossible to install the conventional rotary window cleaner in the general automobiles, the majority of which is of the front engine type.

SUMMARY OF THE INVENTION

Accordingly, the present invention has been made in order to solve the problem mentioned above, and its object is to provide a rotary window cleaner capable of being installed in the front engine type vehicles in general by means of curving a water collecting box connected to the lower section of a windowpane toward the driver's compartment opposite to the engine room so as not to touch an engine.

The window cleaner according to the present invention comprises a water collecting box connected to the lower section of a windowpane and curved toward the driver's compartment, means for draining rain and snow provided at the lower section of the water collecting box, and wipers installed in the water collecting box so as to perform continuous rotations along the outer surface of windowpane and in the water collecting box by straightening on the linear section of the outer surface of the windowpane and by curving on the curved section of the windowpane and in the water collecting box.

BRIEF DESCRIPTION OF THE DRAWINGS

FIG. 3 is a fragmentary sectional view illustrating an example of drainage means suitable to snow or the like;

FIG. 5 is a front view illustrating a means for opening and closing a opening-closing cover of the drainage means suitable to snow or the like;

DETAILED DESCRIPTION OF THE PREFERRED EMBODIMENTS

With reference to the accompanying drawings, descriptions will now be made off the perferred embodiments of a rotary window cleaner according to the present invention.

Figure 1:
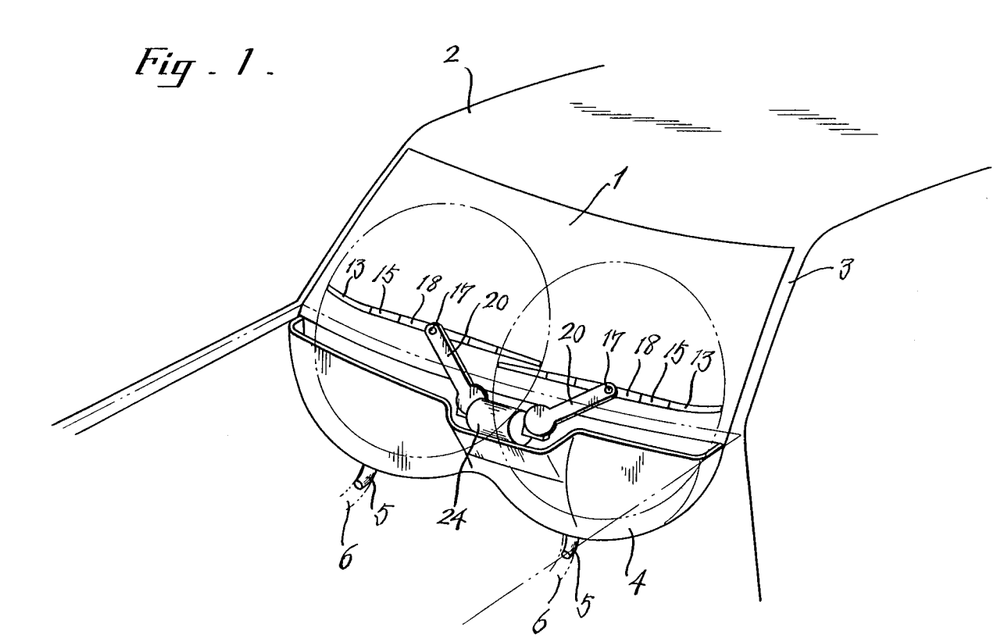
FIG. 1 is a perspective view of a preferred embodiment of rotary window cleaner according to the present invention.
Figure 2:
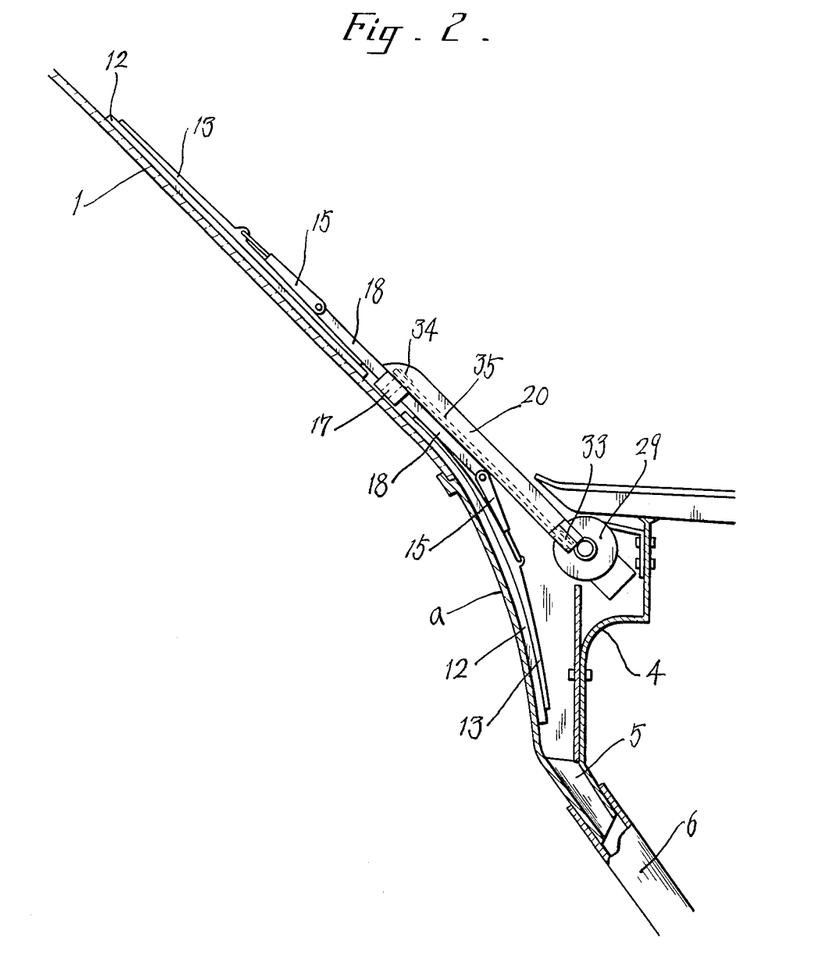
FIG. 2 is a longitudinal sectional view along one of wipers.

In the drawings, numeral 1 indicates a windowpane inserted in a front window frame 3 of a vehicle 2, and the windowpane 1 is formed in such configuration that both sides are curved as shown in FIG. 1 and a central section becomes linear as shown in FIG. 2.

A water collecting box 4 is connected to the lower section of the windowpane 1. The side configuration of the water collecting box 4 is shaped so as to curve and extend downward underneath the windowpane 1 as shown in FIG. 2, while the front face is shaped in such a configuration of FIG. 1 that two semicircular arcs join together in case of vehicles in general using a pair of wipers so that small portions of the water collecting box 4 may enter in an engine room. The rear face (a) of the water collecting box 4 is joined to the windowpane 1 in such a way as to form a continuous face with it and as to prevent the wipers from being damaged by the joining section.

Figure 3:
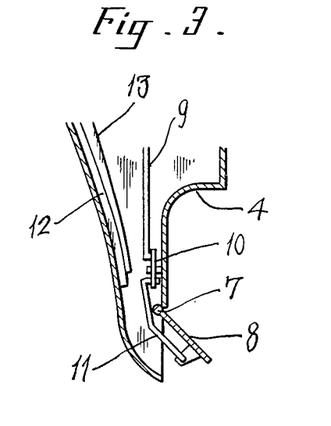
Figure 4:
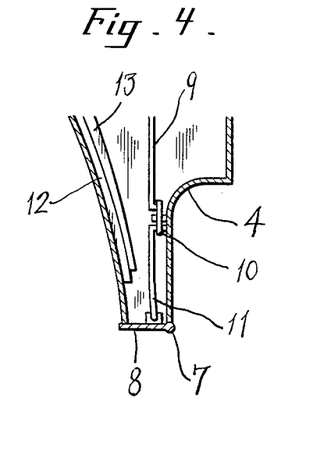
FIG. 4 is a fragmentary sectional view illustrating another example of means shown in FIG. 3.
Figure 5:
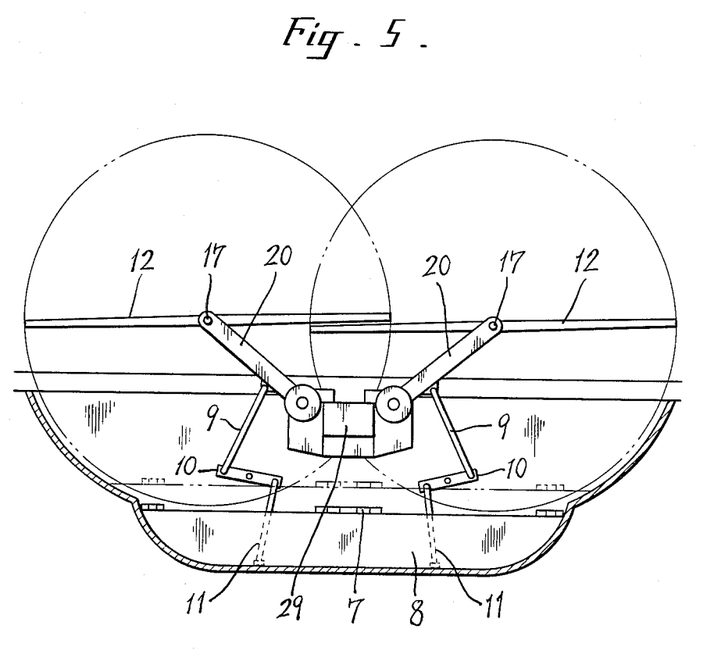

For vehicles used in non-snowfall districts, as shown in FIG. 2, drainage ports 5, 5 are provided underneath the water collecting box 4, and drainage pipes 6, 6 are connected to the drainage ports 5, 5 respectively so as to drain rain collected in the water collecting box 4 to the exterior of vehicles. For vehicles used in snowfall districts, as shown in FIG. 3, a bottom section of the water collecting box 4 is shaped in an inclined bottom so that its front may become lower and an opening-closing cover 8 may be formed by means of fitting a lower section of a front wall to an upper section with a hinge 7, or as shown in FIG. 4, the opening-closing cover 8 is formed by means of fitting the bottom section the water collecting box 4 to the front wall with the hinge 7. In the construction mentioned above, a connecting rod 11 fixed to the opening-closing cover 8 is connected through a lever 10 to a connecting rod 9 fixed to a supporting body of the wiper, whereby opening and closing of the opening-closing cover 8 are linked with up-and-down movements of the supporting body for making the opening-closing cover open at the time of operation of wiper so as to perfectly discharge snow, frozen rain drops and hail and also even fallen leaves and the like from the drainage port.

For opening or closing the above-mentioned opening-closing cover 8, special opening and closing means can also be used if necessary.

Figure 7:
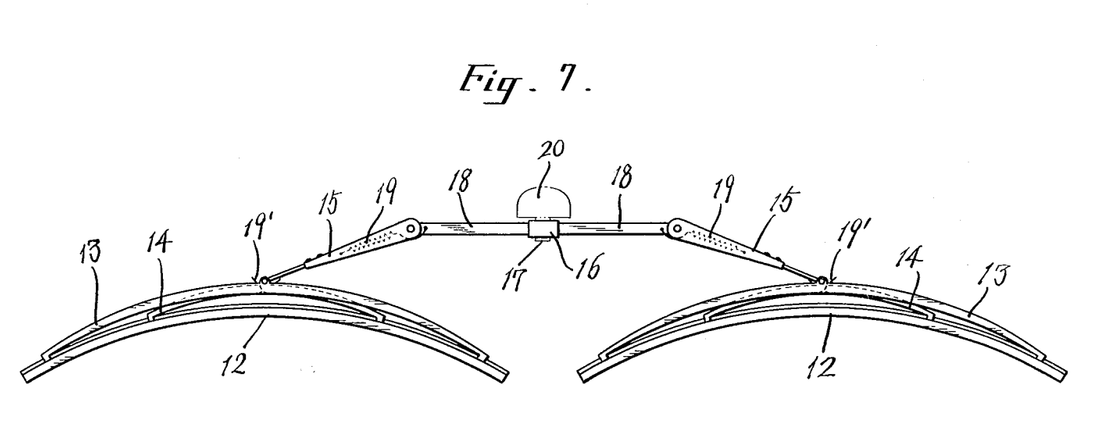
FIG. 7 is a plan view illustrating the construction of wipers.
Figure 8:
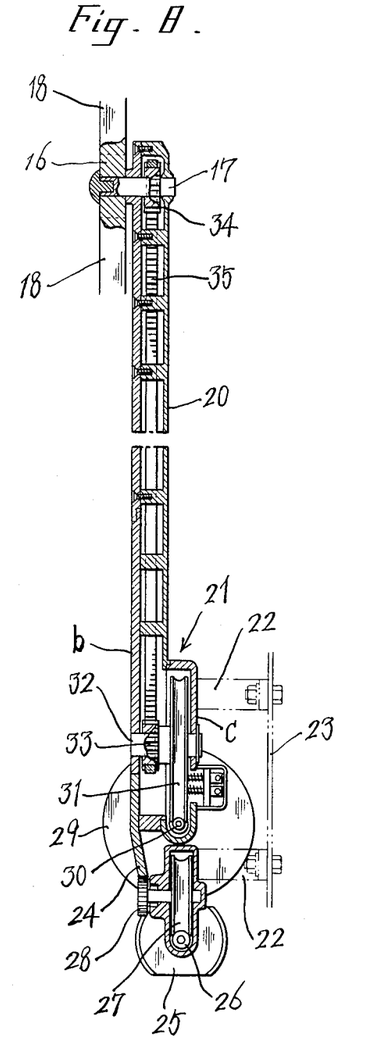
FIG. 8 is a vertical side view illustrating a means for up-and-down movements and rotations of wipers.

Wipers 12 for wiping rain and snow off the outer surface of windowpane 1 are formed by such materials of rubber and the like that cause no damage to glass in the length capable of deformingly wiping a necessary range of the outer surface of the windowpane 1. The wipers 12 are held at four points at the outsides and insides being supported by two sets of long and short bowed elastic members 13 and 14 as shown in FIG. the middle sections of the two sets of the bowed elastic members 13, 14 are pivotally connected to the outer ends of top arms 15, 15 as shown in FIG. 7 and the base end of the top arms 15, 15 are pivotally mounted by shaft to the top ends of base arms 18, 18 which are attached to a rotary shaft 17 by a boss 16. Compression springs 19', 19 are installed between the pivoting points of the top arms 15, 15 and the bowed elastic members 13, 14 and 13, 14; the compression springs 19', 19' being actuated so as to push end extend the bowed elastic members 13, 14 and 13, 14. In consequence, by engaging elastically pressing springs 19, 19 with the arms 15, 15 so that the arms may incline toward the outer surface of the windowpane, the wipers 12, 12 are so formed as to curve in the water collecting box 4 and on the curved section of the outer surface of the windowpane 1 as shown in the lower part of FIG. 2 and as to extend straight in the linear section of the outer surface of the windowpane 1 as shown in the upper part of FIG. 2, whereby the wipers 12, 12 can always make contact with the wiping surface of the windowpane 1.

Figure 6:
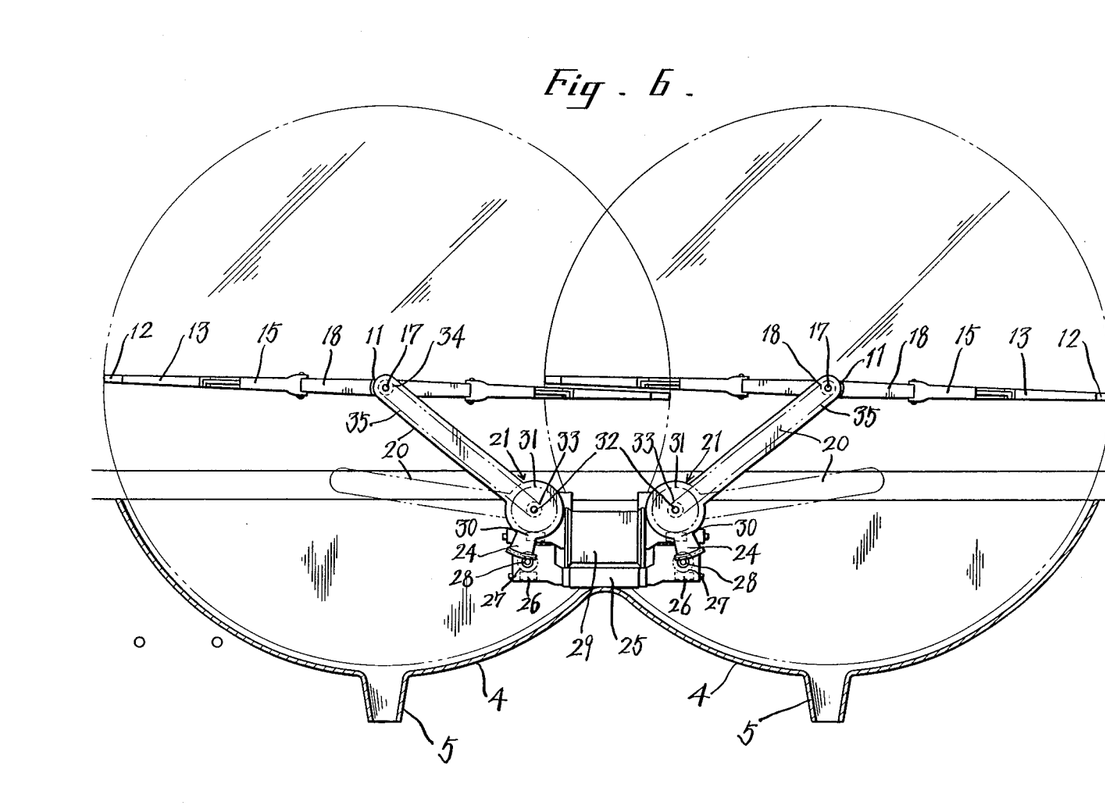
FIG. 6 is a longitudinal front view of water collecting box.

A supporting body 20 supports at its top end the rotary shaft 17 and is provided at its base with a movable side (b) for a circular gear box 21. The movable side (b) is engaged to be rotatable in either direction with a fixed side (c) which is secured by a mounting member 22 to a mounting section 23 on a vehicle side. A sector gear 24 is formed on the lower edge of the movable side (b), is engage with a pinion 28. The pinion 28 is connected to a motor 25 through a worm 26 and a worm wheel 27 to thereby transmit rotary movement to the sector gear 24. By rotating the pinion 28 in clockwise and counterclockwise directions, the sector gear 24 moves the supporting body 20 up and down, resulting in positioning the wipers 12, 12 at the working positions shown by the full lines in FIG. 6 and at the storing positions shown by the phantom lines In the abovementioned gear box 21, a toothed pulley 33 is secured on the supporting shaft 32 of a worm wheel 31 meshing with a worm 30 connected to a motor 29 so that the rotation of the motor is transmitted from the worm 30 and the pulley 33 to a second toothed pulley 34. The second pulley 34 is secured to the rotary shaft 17 at the top end of the supporting body 20 and is operatively connected to it, through a toothed belt (timing belt) 35 tensioned between both. Thus the apparatus is so arranged that a continuously rotating force is given to the wipers 12, 12 in a constant direction.

If necessary, the means for transmitting rotations through the abovementioned pulleys 33, 34 and belt 35 can be replaced with a transmission comprising sprocket and chain means or by the use of two sets of bevel gears and a transmission shaft (all of which are not shown).

The rotary window cleaner according to the present invention is made so that its wipers 12 can be stopped at position not interfering with the field of vision of a driver at the time of non-use. At the time of rainfall or snowfall the wipers 12 are positioned so as to wipe the required range of view and are rotated by the motor 29. In order to effect the foregoing wipers 12 curve according to the curve of the water collecting box 4 as shown on the lower side of FIG. 2 as they pass through the water collecting box 4, while on the outer surface of the windowpane 1 both ends of the wipers 12 curve, the the curvature is so reduced as the wipers 12 approach the center portion of the windowpane 1 that they assume a straight line shape. Therefore, according to such changes, the wipers 12 extend gradually to be straight at the center portion as shown on the upper side of FIG. 2, and subsequently, to increase their curvature gradually to enter in the water collecting box 4. By repeating the motion described above, the wipers 12 of the rotary window cleaner wipe off rain or snow falling on the outer surface of the windowpane 1 and push the rain or snow into the water collecting box 4, to be discharged through the drainage means 6 to the exterior. When the speed of the motor 29 is adjusted corresponding to the amount of rain or snow or the running speed of vehicle in such a way that the speed of rain or snow falling on the outer surface of windowpane is compatible with the wiping speed of the wipers, such large amounts of rain or snow that could not be wiped off by the conventional reciprocating type window cleaner are completely wiped off without causing re-scattering. Moreover the wipers 12, rotating from the outer surface of the windowpane 1 through the water collecting box 4 are wide in the range of wiping without causing remaining rain or snow on such portions that interrupt a field of vision in front of a driver.

The rotary window cleaner according to the present invention are so arranged that the wipers curve and stretch as they pass through the water collecting box and over the outer surfaces of the windowpane. Accordingly, rain, snow and the like are completely removed from the outer surface of the windowpane by the rotation of wipers, and the abovementioned water collecting box, which is curved and lowered downward, becomes shallow in depth entering in the engine room. The collecting box does not touch the engine of the front engine type automobiles. Therefore, the rotary window cleaner can be extensively installed in those automobiles, in which it has so far been impossible to install this type of window cleaner, for completely remove rain or snow from their windshields even in the event of heavy rainfall or snowfall, and enables drivers to carry out safe driving by eliminating the interruption of a field of vision in front owing to rain or snow from the windshields.

What is claimed is:

1. A rotary windshield wiper for front engine type automobiles, comprising rotational wiper means for sweeping the windshield, a water collecting box mounted to the lower section of the windshield, said water collecting box having a rear wall curving toward the driver's compartment and a front wall extending downward into the engine compartment in spaced opposition to the engine, said compartment being provided with drainage means along the lower edge thereof, said rotational wiper means being supported by arm means comprising a pair of articulated arms bendable such that said wiper means extends substantially straight on the linear sections of the windshield and bends on the curved sections of the windshield as well as on the curved sections of the water collecting box, whereby said wiper means maintains contact at all times with the outer surface of the windowpane as well as with the rear wall of the water collecting box.

2. The rotary windshield wiper according to claim 1, wherein said arm means comprise a base arm attached to a rotary shaft and a top arm pivoted to said base arm, and spring means connecting said base arm and top arm to each other, said spring means being urged so as to bend said top arm, said top arm being pivoted connected to said rotational wiper means by a bowed flexible member, the pivoted portion of the top arm and rotational wiper means being provided with springs which are urged so as to extend said rotational wiper means.

3. The rotary windshield wiper according to claim 1, wherein said drainage means includes an opening and closing cover connected by means of an intermediate lever arrangement to the supporting body of the wipers so as to keep the opening and closing covers in the open position only when the wipers are in operation.

* * * * *